(12) United States Patent
Dai

(10) Patent No.: US 12,292,100 B1
(45) Date of Patent: May 6, 2025

(54) ADJUSTMENT MECHANISM, ARMREST, AND SEAT

(71) Applicants: ANJI SUEE SMART HOME CO., LTD, Huzhou (CN); ANJI LINUO ELECTRONIC TECHNOLOGY CO., LTD, Huzhou (CN)

(72) Inventor: Longfei Dai, Huzhou (CN)

(73) Assignees: ANJI SUEE SMART HOME CO., LTD, Huzhou (CN); ANJI LINUO ELECTRONIC TECHNOLOGY CO., LTD, Huzhou (CN)

(*) Notice: Subject to any disclaimer, the term of this patent is extended or adjusted under 35 U.S.C. 154(b) by 0 days.

(21) Appl. No.: 19/014,196

(22) Filed: Jan. 8, 2025

Related U.S. Application Data

(63) Continuation of application No. PCT/CN2024/096544, filed on May 31, 2024.

(30) Foreign Application Priority Data

Apr. 19, 2024 (CN) .......................... 202420836541.7

(51) Int. Cl.
*F16H 21/54* (2006.01)
*A47C 7/54* (2006.01)

(52) U.S. Cl.
CPC ............. *F16H 21/54* (2013.01); *A47C 7/541* (2018.08)

(58) Field of Classification Search
CPC ................................ F16H 21/54; A47C 7/541
See application file for complete search history.

(56) References Cited

U.S. PATENT DOCUMENTS

| | | | |
|---|---|---|---|
| 12,144,432 B1* | 11/2024 | Chen | A47C 4/045 |
| 2010/0033005 A1 | 2/2010 | Lee | |
| 2015/0001901 A1 | 1/2015 | Lucas | |
| 2021/0370815 A1 | 12/2021 | Zimmermann et al. | |

* cited by examiner

*Primary Examiner* — Terence Boes

(57) ABSTRACT

In an adjustment mechanism, a linkage rod is hinged to a linkage end of a first connecting rod and a linkage end of a second connecting rod. When the adjustment mechanism receives an external force, the linkage rod can generate a movement tendency, such that connecting components can be quickly unfolded or folded. An armrest is further provided. The adjustment mechanism is arranged as an adjustment module between a fixed vertical board and a movable vertical board of the armrest to unfold or fold the armrest. When the width of the armrest changes, the total length of the first connecting rod and the second connecting rod can be selectively matched according to the change in the width of the armrest, and the adjustment mechanism can hence be applicable to armrests of various width specifications.

8 Claims, 16 Drawing Sheets

ADJUSTMENT MECHANISM, ARMREST, AND SEAT

CROSS-REFERENCE TO RELATED APPLICATIONS

This application is a continuation of International Patent Application No. PCT/CN2024/096544 with a filing date of May 31, 2024, designating the United States, now pending, and further claims priority to Chinese Patent Application No. 202420836541.7 with a filing date of Apr. 19, 2024. The content of the aforementioned applications, including any intervening amendments thereto, is incorporated herein by reference.

TECHNICAL FIELD

The present disclosure relates to the field of furniture, and in particular, to an adjustment mechanism, an armrest, and a seat.

BACKGROUND

A sofa generally includes a seat assembly and a back assembly, and the seat assembly is provided with armrests on both sides. Traditional armrests are generally made of metal or wood, and such armrests are heavier. Therefore, some manufacturers produce a sofa armrest of a hollow side board structure to reduce the cost of product packaging and transportation. This sofa armrest includes a fixed inner side board connected to the sofa, and movable outer side boards arranged at an interval in parallel on the left and right sides of the fixed inner side board. To allow the movable outer side boards to extend and retract relative to the fixed inner side board, an adjustment mechanism is provided between the inner side board and the movable outer side boards. Under the action of the adjustment mechanism, the movable outer side boards can freely move close to or away from the fixed inner side board, thereby reducing the overall packaging volume of the sofa and increasing the container loading quantity of the sofa while ensuring the support function of the armrest.

It is necessary to provide an adjustment mechanism with a simple structure capable of being applied to kinds of sofa with different types and sizes.

SUMMARY OF PRESENT INVENTION

An objective of the present disclosure is to provide an adjustment mechanism. The mechanism is simple and practical. A linkage rod is hinged to a linkage end of a first connecting rod and a linkage end of a second connecting rod. When the adjustment mechanism is suffered from an external force, the linkage rod can generate a movement tendency and make a connecting end of the first connecting rod and a connecting end of the second connecting rod drive two connecting components to move close to or away from each other, such that the connecting components can be quickly unfolded or folded.

An armrest is further provided. The adjustment mechanism is arranged as an adjustment module between a fixed vertical board and a movable vertical board of the armrest to unfold or fold the armrest. When the width of the armrest changes, the total length of the first connecting rod and the second connecting rod can be selectively matched according to the change in the width of the armrest, such that the adjustment mechanism can be applicable to armrests of various width specifications.

A seat is further provided. By arranging armrests symmetrically on both sides of a seat body, the volumes of the left and right sides of the seat can be freely changed, such that the seat occupies less space when packed, thereby further reducing the packing cost of the sofa.

The technical solutions of the present disclosure are implemented as follows:

an adjustment mechanism, including:
a connecting assembly, including two connecting components arranged at an interval, where the two connecting components have an unfolded state in which the two connecting components are away from each other and a folded state in which the two connecting components are close to each other, and at least two adjustment rod groups arranged side by side are provided between the two connecting components;

the adjustment rod groups, each including a first connecting rod and a second connecting rod which are respectively hinged to the two connecting components, where the first connecting rod and the second connecting rod each include a connecting end hinged to the corresponding connecting component and a linkage end away from the connecting end; and a linkage rod, hinged to the linkage end of the first connecting rod and the linkage end of the second connecting rod in each adjustment rod group, where under the action of an external force on the adjustment mechanism, the linkage rod is enabled to generate a movement tendency and hence drive the first connecting rod and the second connecting rod in each adjustment rod group to rotate, the two connecting components are hence enabled to move away from or close to each other, and the connecting assembly is switched between the unfolded state and the folded state accordingly.

Preferably, a synchronous structure is provided between the first connecting rod and the second connecting rod, and includes a first tooth portion provided on the linkage end of the first connecting rod and a second tooth portion provided on the linkage end of the second connecting rod; and the first tooth portion and the second tooth portion are engaged with each other to ensure synchronous rotation of the first connecting rod and the second connecting rod, thereby avoiding the influence of the folding or unfolding effect between the two connecting components due to the inconsistent rotation angles of the first connecting rod and the second connecting rod.

Preferably, a limiting structure is provided between the first connecting rod and the second connecting rod, and includes a first limiting surface provided at the linkage end of the first connecting rod and a second limiting surface provided at the linkage end of the second connecting rod; when the connecting assembly is in the folded state, the first limiting surface is apart from the second limiting surface; when the connecting assembly is switched to the unfolded state, the first limiting surface abuts against the second limiting surface; and the limiting structure can keep the first connecting rod and the second connecting rod fixed after the two connecting components are folded, thereby preventing the connecting components from being unfolded due to accidental touch.

Preferably, the first connecting rod and the second connecting rod have a same length; and the first connecting rod and the second connecting rod having the same length can ensure when rotating that the two connecting components are unfolded or folded in a same direction, thereby avoiding the folding misalignment or unfolding misalignment of the two connecting components due to different rod lengths.

Preferably, the two connecting components are both L-shaped boards made of metal, and the two L-shaped boards are arranged in a central symmetry manner; when the connecting assembly is in the folded state, an accommodating region for accommodating the adjustment rod groups and the linkage rod is formed between the two L-shaped boards; and the accommodating region may provide a space for the linkage rod and the adjustment rod groups in the folded state, such that the linkage rod and the adjustment rod groups are not exposed outside.

Preferably, the L-shaped boards each include a first vertical board and a second vertical board which are perpendicular to each other; the connecting end of the first connecting rod is hinged to the first vertical board of one L-shaped board, and the connecting end of the second connecting rod is hinged to the first vertical board of the other L-shaped board; the second vertical board extends in a direction perpendicular to the first vertical board, such that two extension portions exceeding the accommodating region in opposite directions are formed between the two L-shaped boards; and the two extension portions in the opposite directions may form two opposite mounting portions, to facilitate connection between the connecting components and other components needing to be folded or unfolded.

Preferably, a through connecting notch is formed in the extension portion of the second vertical board; and the connecting notch may conveniently allow a fastener to pass through, such that the connecting components are connected, by fastening, to the other components needing to be folded or unfolded.

Preferably, the first connecting rod, the second connecting rod, and the linkage rod are all rigid rod members made of metal; and the metal rigid rod members have high structural strength and strong deformation resistance, and can make the service life of the adjustment mechanism longer.

Further provided is an armrest, including a movable vertical board and a fixed vertical board which are arranged at an interval in parallel on the left and right sides, and at least one adjustment mechanism. Two connecting components of the adjustment mechanism are respectively connected to the movable vertical board and the fixed vertical board to drive the movable vertical board of the armrest to be away from or close to the fixed vertical board, such that the armrest is switched between an unfolded state and a folded state.

Preferably, there are two adjustment mechanisms symmetrically arranged back and forth between the movable vertical board and the fixed vertical board, adjustment rod groups of the adjustment mechanisms are arranged side by side up and down, and the two adjustment mechanisms arranged side by side back and forth can make the front and back ends of the movable vertical board and the fixed vertical board synchronously folded or unfolded.

Preferably, a linkage handle is further included. The front and back ends of the linkage handle are fixedly connected to the upper ends of two linkage rods symmetrically arranged back and forth; and the linkage handle can synchronously link two adjustment mechanisms arranged back and forth, such that the two adjustment mechanisms synchronously drive the movable vertical board and the fixed vertical board to be folded or unfolded.

Preferably, an armrest skin cover coated between the movable outer side board and the fixed vertical board is further included. When the armrest is in the unfolded state, the armrest skin cover is formed with a flexible support surface in a horizontal tightened state at the upper end of the movable vertical board and the fixed vertical board; and the flexible support surface can allow a soft packing support material to be placed on the armrest, improving the comfort of the armrest.

Preferably, when the armrest is in the folded state, the linkage handle upwards protrudes out of the movable vertical board and the fixed vertical board, and makes the armrest skin cover tightened upwards. When the armrest is switched to the unfolded state, the linkage handle is flush with the upper ends of the movable vertical board and the fixed vertical board, and rigidly supports the flexible support surface horizontally tightened at the upper end of the armrest. When the armrest is folded, under the action of the linkage handle, the outer surface of the tightened armrest skin cover remains flat without wrinkles. When the armrest is unfolded, under the supporting of the linkage handle, the bearing capability of the flexible support surface is improved, such that when placing a soft packing material, the flexible support surface will not sag inwards due to an insufficient support force.

Further provided is a seat, including a seat body and two armrests. The armrests are symmetrically arranged on the left and right sides of the seat body, and fixed vertical boards of the armrests are connected to the seat body.

By adopting the above technical solutions, the present disclosure has the following principles and beneficial effects:

An objective of the present disclosure is to provide an adjustment mechanism. The linkage rod is hinged to the linkage end of the first connecting rod and the linkage end of the second connecting rod. When the adjustment mechanism is suffered from an external force, while the two connecting components are close to or away from each other, the first connecting rod and the second connecting rod rotate such that the included angle therebetween decreases or increases, and the linkage rod drives the adjustment rod groups to move synchronously. Compared with the technical solution in which a rotating rod and a slide groove, which are in a scissor-type structure, are employed, this solution omits the design of the slide groove, and only the linkage rod drives the first connecting rod and the second connecting rod to rotate, to cause the two connecting components to be unfolded or folded. Therefore, the structure is further simplified, and the practicability is greatly improved.

An armrest is further provided. The adjustment mechanism is arranged as an adjustment module between a fixed vertical board and a movable vertical board of the armrest to quickly unfold or fold the armrest. When the width of the armrest changes, the total length of the first connecting rod and the second connecting rod can be changed only according to the change in the width of the armrest, and the total length is matched with the distance between the connecting components to form an adjustment module corresponding to the width specification of the armrest, thereby quickly unfolding or folding the armrest of the corresponding width specification. After the width of the armrest changes, compared with the technical solution in which a rotating rod and a slide groove, which are in a scissor-type structure, are employed, this solution only needs to correspondingly change the total length of the first connecting rod and the second connecting rod, and recalculation of the slide groove or other parameters is not required, such that the adjustment mechanism is more applicable to armrests of various width specifications.

A seat is further provided. By arranging armrests symmetrically on both sides of a seat body, the volumes of the left and right sides of the seat can be freely changed, such that the seat occupies less space when packed. During packing, a limited container space can accommodate more seats. Therefore, the seat mounted with such armrests can further reduce the packing cost.

REFERENCE NUMERALS

Figure 1:
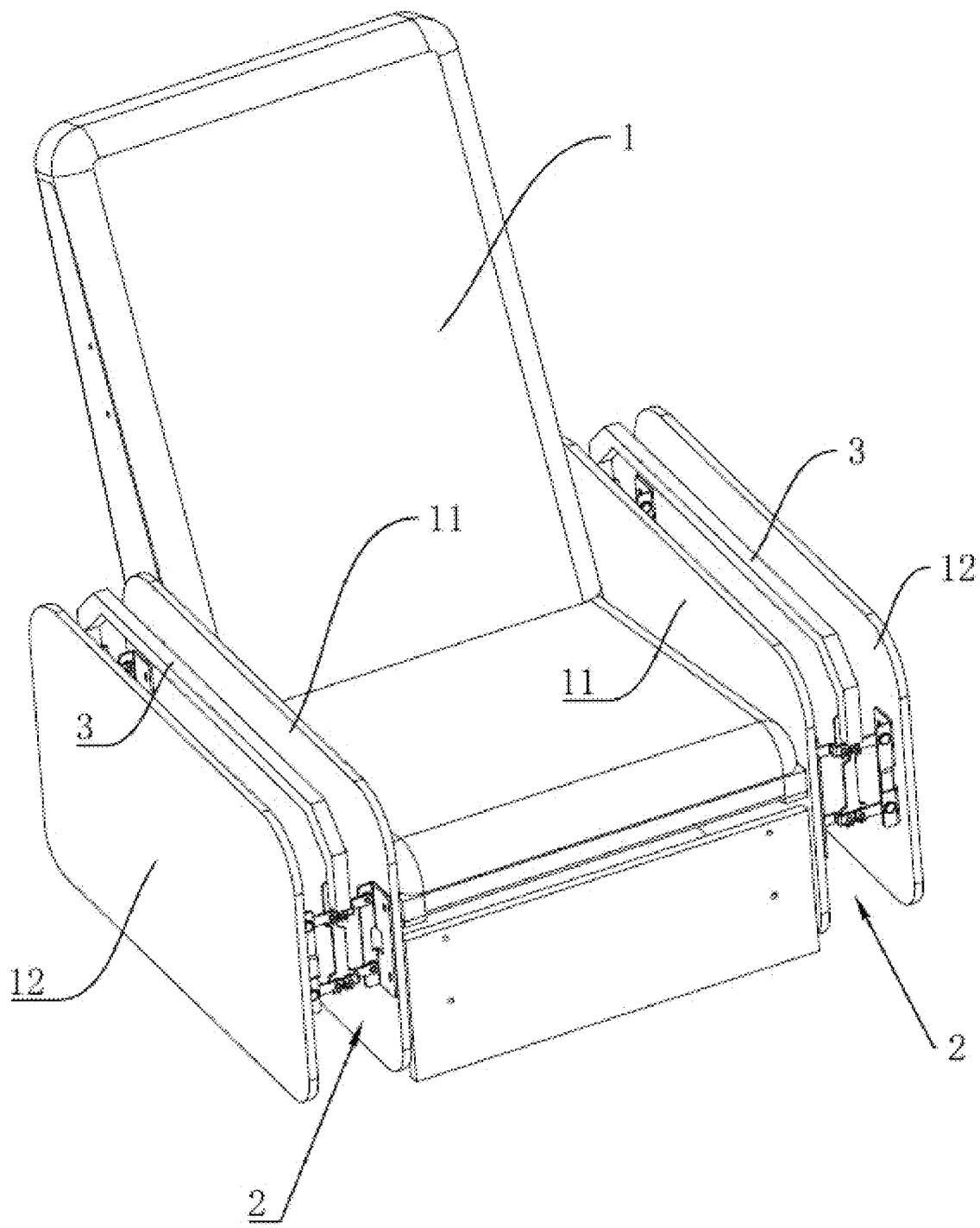
FIG. 1 is a schematic structural diagram showing adjustment mechanisms being mounted on armrests on both sides of a sofa according to Embodiment 1.

1—sofa body, 2—adjustment module, 3—linkage handle, 4—armrest skin cover, 11—fixed vertical board, 12—movable vertical board, 13—armrest module, 21—connecting component, 22—first connecting rod, 23—second connecting rod, 24—rotating shaft, 25—linkage rod, 26—shaft sleeve, 27—washer, 211—connecting notch, 212—first vertical board, 213—second vertical board, 214—avoidance hole, 221—first tooth portion, 222—first limiting surface, 231—second tooth portion, 232—first horizontal portion, 233—bent portion, 234—second horizontal portion, 235—second limiting surface, 251—protruding portion, 252—avoidance region, 253—hinge hole, 254—connecting rod, 255—hinge portion, 41—flexible support surface, a—connecting end, b—linkage end, c—extension portion, and s—accommodating region.

DETAILED DESCRIPTION OF THE EMBODIMENTS

The present disclosure has multiple implementations. As shown in FIG. 1 to FIG. 15, the specific implementations are as follows:

Embodiment 1: as shown in FIG. 1 to FIG. 11, this embodiment provides an adjustment mechanism, including:

a connecting assembly, including two connecting components 21 arranged at an interval, where the two connecting components 21 have an unfolded state in which the two connecting components 21 are away from each other and a folded state in which the two connecting components 21 are close to each other, and at least two adjustment rod groups arranged side by side are provided between the two connecting components 21;

the adjustment rod groups, each including a first connecting rod 22 and a second connecting rod 23 which are respectively hinged to the two connecting components 21, where the first connecting rod 22, the second connecting rod 23, and a linkage rod 25 are all rigid rod members made of metal; the metal rigid rod members have high structural strength and strong deformation resistance, and can make the service life of the adjustment mechanism longer; and the first connecting rod 22 and the second connecting rod 23 each include a connecting end a hinged to the corresponding connecting component 21 and a linkage end b away from the connecting end a; and the linkage rod 25, hinged to the linkage end b of the first connecting rod 22 and the linkage end b of the second connecting rod 23 in each adjustment rod group, where under the action of an external force on the adjustment mechanism, the linkage rod 25 is enabled to generate a movement tendency and drive the first connecting rod 22 and the second connecting rod 23 in each adjustment rod group to rotate; an object that the external force specifically acts on may be the linkage rod 25 or the connecting components 21 of the adjustment mechanism; and the first connecting rod 22 and the second connecting rod 23 when rotating can cause the two connecting components 21 to move away from or close to each other, and the connecting assembly is hence switched between the unfolded state and the folded state.

Figure 3:
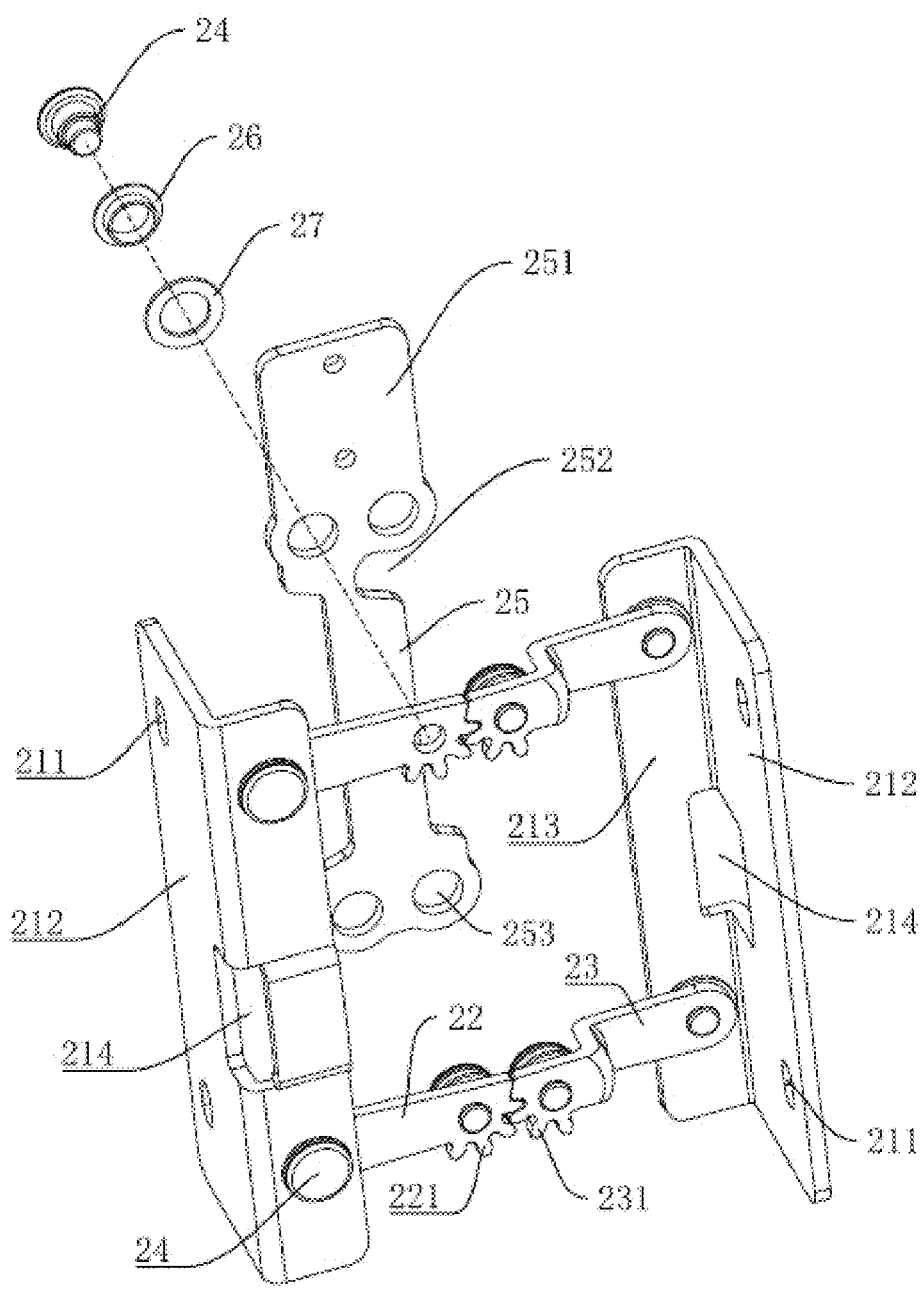
FIG. 3 is an exploded view showing a hinge position between a linkage rod and an adjustment rod group.

Furthermore, as shown in FIG. 3, both ends of the adjustment rod groups are linked to the linkage rod 25 and the connecting components 21 like this: the first connecting rod 22, the second connecting rod 23, the connecting components 21, and the linkage rod 25 are provided with corresponding hinge holes 253. A rotating shaft 24 for providing support for the rotation of the adjustment rod groups or the linkage 25 passes through the hinge holes 253. To avoid direct friction between the rotating shaft 24 and the inner walls of the hinge holes 253, a shaft sleeve 26 is provided between the rotating shaft 24 and the inner walls of the hinge holes 253, and the shaft sleeve 26 can isolate the rotating shaft 24 from the inner walls of the hinge holes 253, thereby avoiding the wear of the inner walls of the hinge holes 253. To avoid friction between the contact end surfaces of the rod members or the contact end surfaces of the connecting components 21 and the adjustment rod groups, a washer 27 for isolating the contact end surfaces of the rod members and the contact end surfaces of the connecting components 21 and the adjustment rod groups is provided therebetween.

Figure 9:
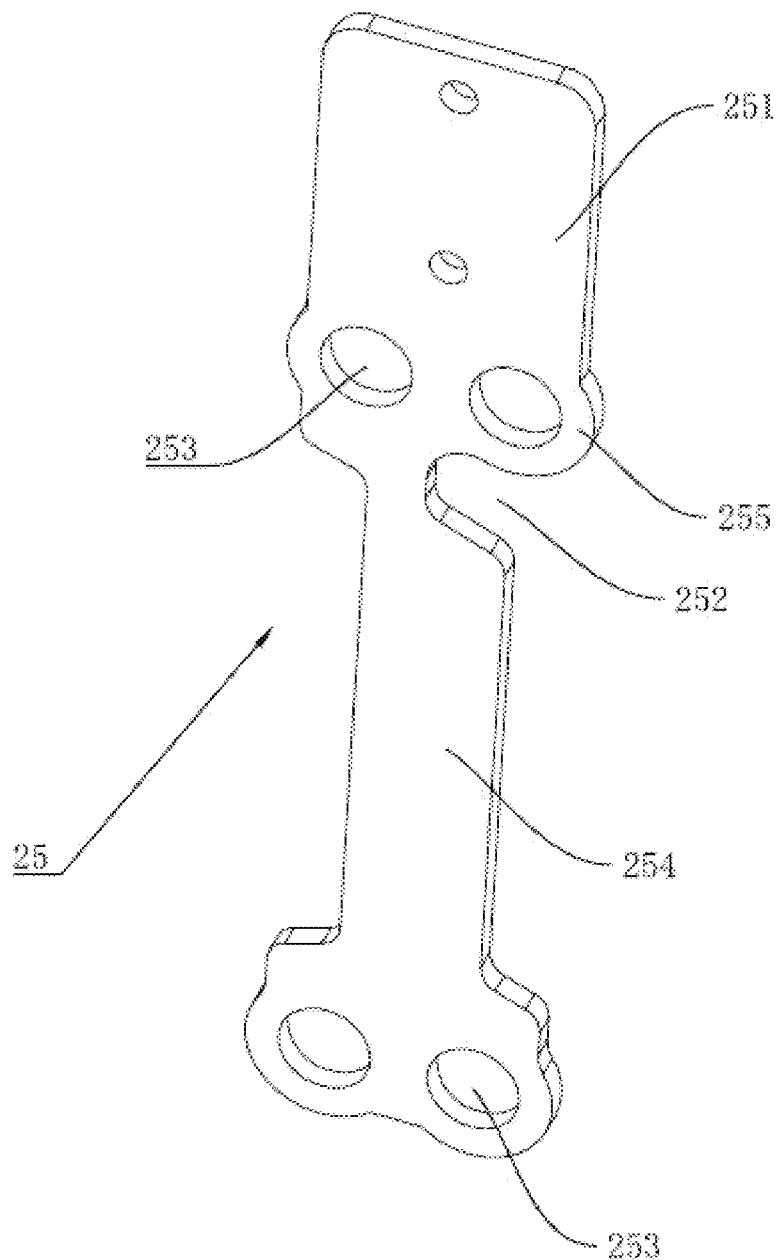
FIG. 9 is a schematic structural diagram showing a linkage rod.

Furthermore, as shown in FIG. 9, the linkage rod 25 includes hinge ends 255. Two symmetric hinge holes 253 are formed in the hinge ends 255. The first connecting rod 22 and the second connecting rod 23 are jointly hinged to the hinge ends 255. A connecting rod 254 is integrally formed between every two hinge ends 255, and the connecting rod 254 can connect all the hinge ends 255, such that the adjustment rod groups hinged to the plurality of hinge ends 255 rotate at the same time.

Figure 2:
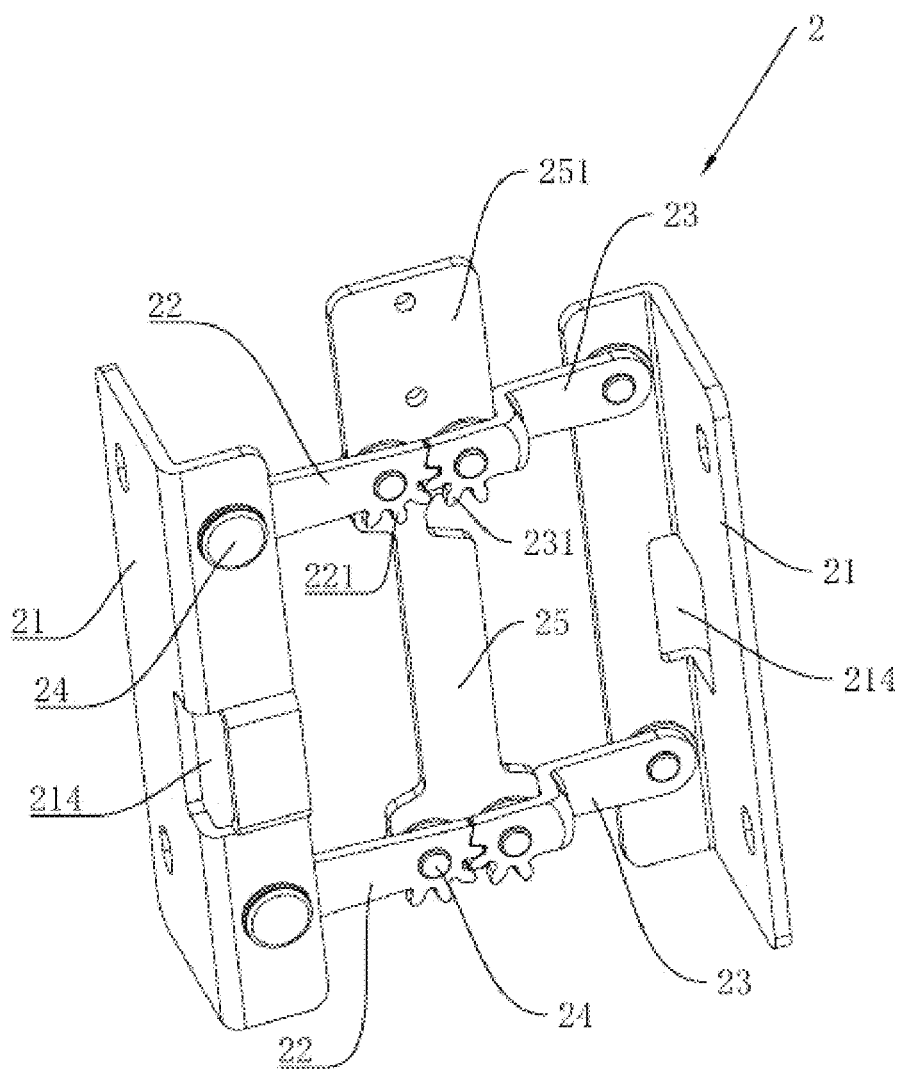
FIG. 2 is a schematic structural diagram showing an adjustment mechanism.
Figure 7:
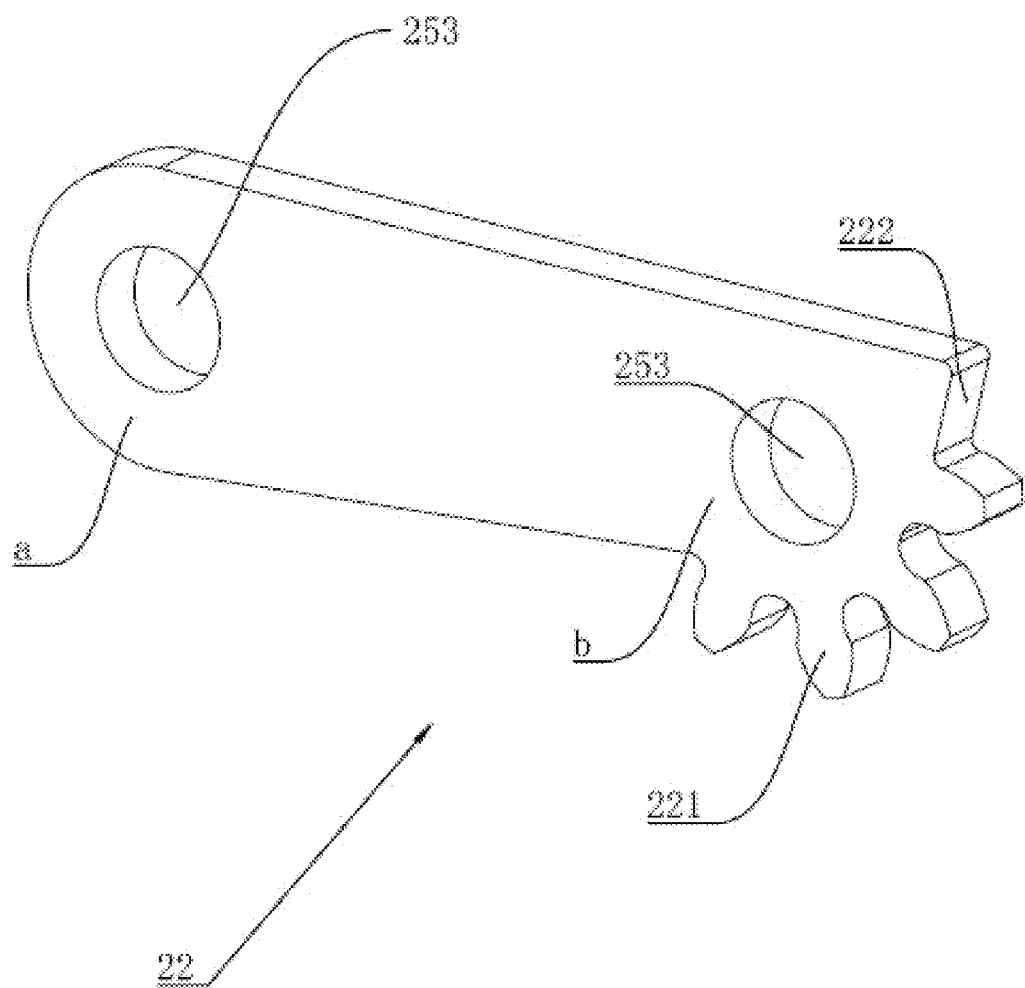
FIG. 7 is a schematic structural diagram showing a first connecting rod.
Figure 8:
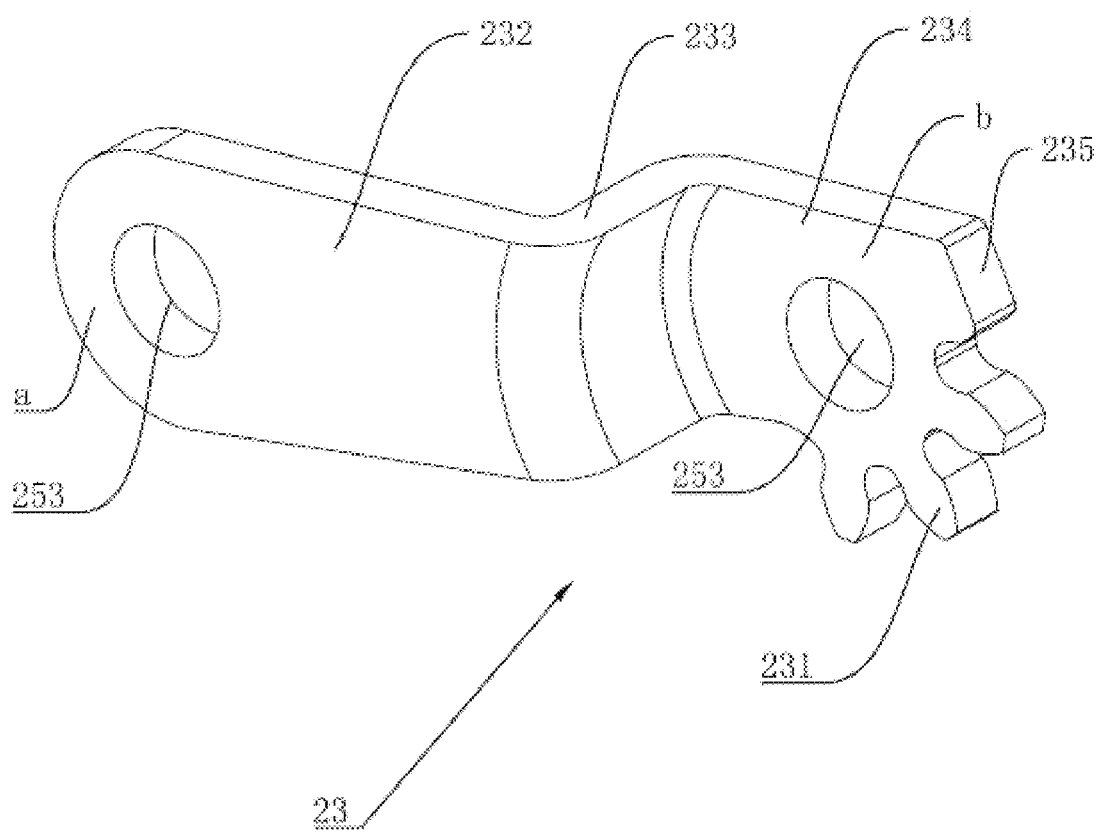
FIG. 8 is a schematic structural diagram showing a second connecting rod.

Furthermore, as shown in FIG. 2, FIG. 7, and FIG. 8, if the first connecting rod 22 and the second connecting rod 23 have inconsistent angles during rotating, the two connecting components 21 connected to may be unparallel, which may affect the folding or unfolding effect between the two connecting components 21. Therefore, a synchronous structure is provided between the first connecting rod 22 and the second connecting rod 23, and includes a first tooth portion 221 provided at the linkage end b of the first connecting rod 22 and a second tooth portion 231 provided at the linkage end b of the second connecting rod 23; and the first tooth portion 221 and the second tooth portion 231 are engaged with each other to ensure synchronous rotation of the first connecting rod 22 and the second connecting rod 23, thereby avoiding the influence of the folding or unfolding effect between the two connecting components 21 due to the inconsistent rotation angles of the first connecting rod 22 and the second connecting rod 23.

Furthermore, when the two connecting components 21 are completely folded, the first connecting rod 22 and the second connecting rod 23 rotate to be close to each other. When the two connecting components 21 are completely unfolded, the first connecting rod 22 and the second connecting rod 23 rotate to a horizontal state. To make the first connecting rod 22 and the second connecting rod 23 in the horizontal state no longer rotate, and make the two connecting components 21 remain fixed, a limiting structure is provided between the first connecting rod 22 and the second connecting rod 23, and includes a first limiting surface 222 provided at the linkage end b of the first connecting rod 22 and a second limiting surface 235 provided at the linkage end b of the second connecting rod 23; when the connecting assembly is in the folded state, the first limiting surface 222 is apart from the second limiting surface 235; when the connecting assembly is switched to the unfolded state, the first limiting surface 222 abuts against the second limiting surface 235; and the limiting structure can keep the first connecting rod 22 and the second connecting rod 23 fixed after the two connecting components 21 are folded, thereby preventing the connecting components 21 from being unfolded due to accidental touch.

Furthermore, when the connecting assembly is in the unfolded state, the first connecting rod 22 and the second connecting rod 23 rotate to the horizontal state, and at this time, the first tooth portion 221 and the second tooth portion 231 are still engaged with each other. When one of the first tooth portion 221 and the second tooth portion 231 generates a rotation tendency, the other still tooth portion can limit the rotation of the corresponding tooth portion. Specifically, because the linkage rod 25 is a rod member for linking synchronous rotation of the first connecting rod 22 and the second connecting rod 23, when the linkage rod 25 remains still, when one of the first connecting rod 22 and the second connecting rod 23 in the horizontal state generates a rotation tendency under the action of an external force, the other connecting rod remains still, such that the first tooth portion 221 and the second tooth portion 231 do not generate a tendency of synchronous rotary engagement. Therefore, the still tooth portion of the first tooth portion 221 and the second tooth portion 231 forms rotary limitation to the tooth portion about to rotating, thereby preventing the connecting assembly from being switched to the folded state under the action of accidental touch or a disturbing force.

Furthermore, to keep the two connecting components 21 parallel to each other and not misaligned when in the unfolded or folded state, the first connecting rod 22 and the second connecting rod 23 have a same length; and the first connecting rod 22 and the second connecting rod 23 having the same length have an overlapped trajectory when rotating, which can ensure when rotating that the two connecting components 21 are unfolded or folded in a same direction, thereby avoiding the folding misalignment or unfolding misalignment of the two connecting components 21 due to different rod lengths.

Figure 4:
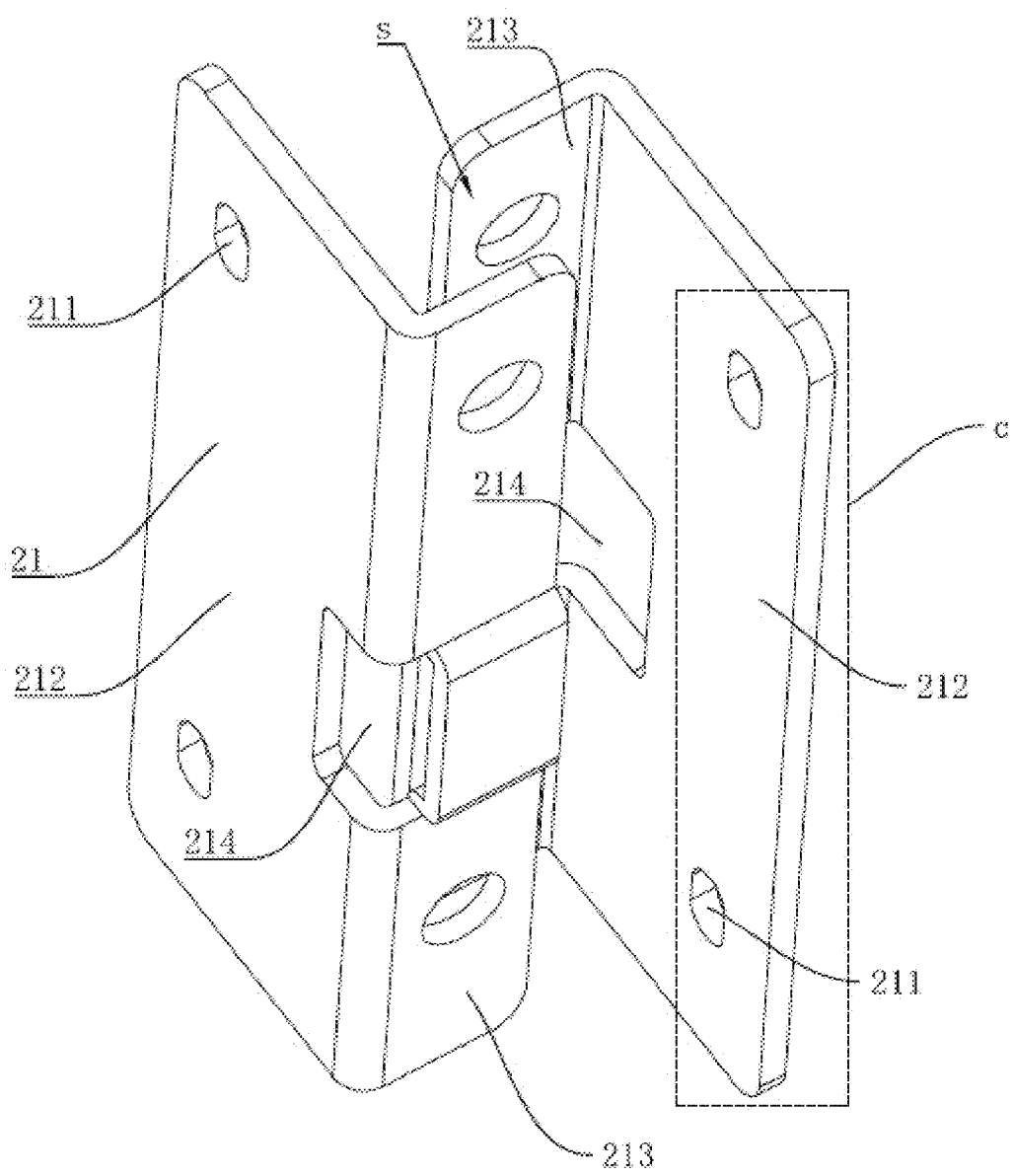
FIG. 4 is a schematic diagram showing an accommodating region when connecting components are in a folded state.
Figure 5:
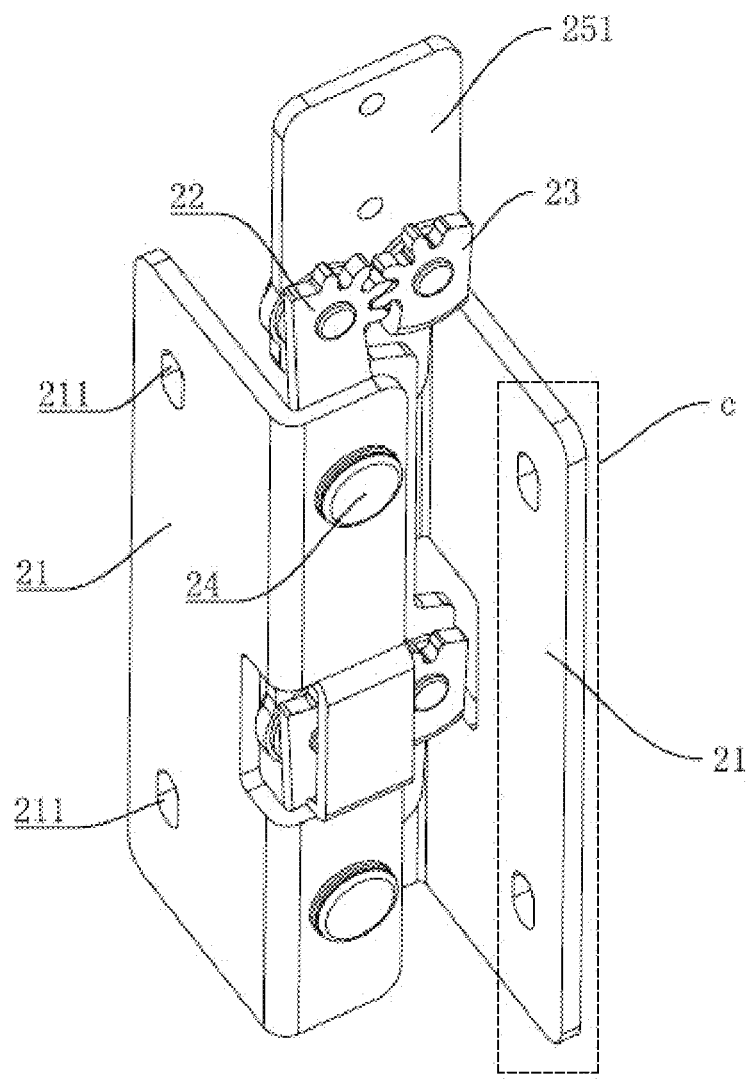
FIG. 5 is a schematic diagram showing an adjustment mechanism being folded in an accommodating region when connecting components are in a folded state.

Furthermore, as shown in FIG. 4 and FIG. 5, the connecting components 21 are L-shaped boards made of metal, and the two L-shaped boards are arranged in a central symmetry manner; when the connecting assembly is in the folded state, the two L-shaped boards are staggered from each other; an accommodating region s for accommodating the adjustment rod groups and the linkage rod 25 is formed between inner sides of the two L-shaped boards; and the accommodating region s is a rectangular region defined by corners of the two L-shaped boards, and may provide a space for the linkage rod 25 and the adjustment rod groups in the folded state, such that the linkage rod 25 and the adjustment rod groups are not exposed outside.

Furthermore, the L-shaped boards each include a first vertical board 213 and a second vertical board 212 which are perpendicular to each other; the connecting end a of the first connecting rod 22 is hinged to the first vertical board 213 of one L-shaped board, and the connecting end a of the second connecting rod 23 is hinged to the first vertical board 213 of the other L-shaped board; the second vertical board 212 extends in a direction perpendicular to the first vertical board 213, such that two extension portions c exceeding the accommodating region s in opposite directions are formed between the two L-shaped boards; the two extension portions c in the opposite directions may provide mounting positions, such that the L-shaped boards are conveniently connected to other components needing to be folded or unfolded; the components needing to be folded or unfolded are two vertical boards on the armrest; and during mounting, the two extension portions c are located on two opposite sides, so there is no need to worry about crowded mounting space or interference with fasteners.

Furthermore, a through connecting notch 211 is formed in the extension portion c of the second vertical board 212; and the connecting notch 211 may conveniently allow a fastener to pass through, such that the connecting components 21 are connected, by fastening, to the other components needing to be folded or unfolded.

Furthermore, the two L-shaped boards are staggered from each other, and the first vertical board 213 is not on the same plane. Therefore, in the adjustment rod groups, the first connecting rod 22 is a linear rod member, and the second connecting rod 23 is not a linear rod member. The second connecting rod 23 includes a first horizontal portion 232 hinged to the first vertical board 213 of one connecting component 21. The first horizontal portion 232 extends to a plane where the first vertical plate 213 of the other connecting component 21 is located, to form a bent portion 233. The bent portion 233 horizontally extends to form a second horizontal portion 234 hinged to the linkage rod 25. Through such a bent structural design, two first vertical boards 213 which are not on the same plane can also be smoothly hinged by means of the second connecting rod 23.

Furthermore, as shown in FIG. 3 to FIG. 9, when the connecting assembly is in the folded state, the first connecting rod 22 and the second connecting rod 23 are driven by the linkage rod 25 to rotate to a side-by-side state. To prevent the folded connecting assembly from interfering with the adjustment rod groups or the linkage rod 25, a plurality of avoidance structures are provided on the adjustment mechanism. Specifically, to avoid interference between the bent portion 233 and the linkage rod 25, an avoidance region 252 for avoiding the bent portion 233 is provided at the intersection of the hinge end of the linkage rod 25 and the connecting rod. moreover, to prevent the hinge end 253 of the linkage rod 25 from interfering with the L-shaped boards, a through avoidance hole 214 is provided at corresponding positions on the L-shaped boards.

As shown in FIG. 1, on the basis of the adjustment mechanism, an armrest is further provided. The armrest includes a movable vertical board 12 and a fixed vertical board 11 which are arranged at an interval in parallel on the left and right sides, and at least one adjustment mechanism. The adjustment mechanism is arranged as an adjustment module between the movable vertical board 12 and the fixed vertical board 11. Two connecting components 21 of the adjustment mechanism are respectively connected to the movable vertical board 12 and the fixed vertical board 11 to drive the movable vertical board 12 of the armrest to be away from or close to the fixed vertical board 11, such that the armrest is switched between the unfolded state and the folded state.

When the width of the armrest changes, that is, the distance between the movable vertical board 12 and the fixed vertical board 11 changes, a user can change the total length of the first connecting rod 22 and the second connecting rod 23 in the adjustment module 2 according to the distance between the movable vertical board 12 and the fixed vertical board 11. When making changes, the total length of the first connecting rod 22 and the second connecting rod 23 is configured to be no less than the distance between the movable vertical board 12 and the fixed vertical board 11, then the old total length of the first connecting rod 22 and the second connecting rod 23 is removed, and the first connecting rod 22 and the second connecting rod 23 with the changed length are mounted in the adjustment module 2. Compared with other adjustment mechanisms with complex parameters, the adjustment module 2 in this embodiment does not need to recalculate multiple parameters, but only needs to change the first connecting rod 22 and the second connecting rod 23 of different lengths accordingly. Therefore, the adjustment mechanism is more suitable for armrests with different width specifications.

Furthermore, as shown in FIG. 1, to enable the movable vertical board 12 and the fixed vertical board 11 to be unfolded or folded synchronously at various positions, there are two adjustment mechanisms symmetrically arranged back and forth between the movable vertical board 12 and the fixed vertical board 11, adjustment rod groups of the adjustment mechanisms are arranged side by side up and down, and the two adjustment mechanisms arranged side by side back and forth can make the front and back ends of the movable vertical board 12 and the fixed vertical board 11 synchronously folded or unfolded.

Furthermore, as shown in FIG. 1, the armrest further includes a linkage handle 3. The front and back ends of the linkage handle 3 are fixedly connected to the upper ends of two linkage rods 25 symmetrically arranged back and forth. The upper ends of the linkage rods 25 are provided with protruding portions 251 exceeding upwards, and the protruding portions 251 are connected to the lower end of the linkage handle 3 by means of screws. The linkage handle 3 can be lifted up and down under the action of an external force, and synchronously link two adjustment mechanisms arranged back and forth, such that the two adjustment mechanisms synchronously drive the movable vertical board 12 and the fixed vertical board 11 to be folded or unfolded.

Figure 6A:
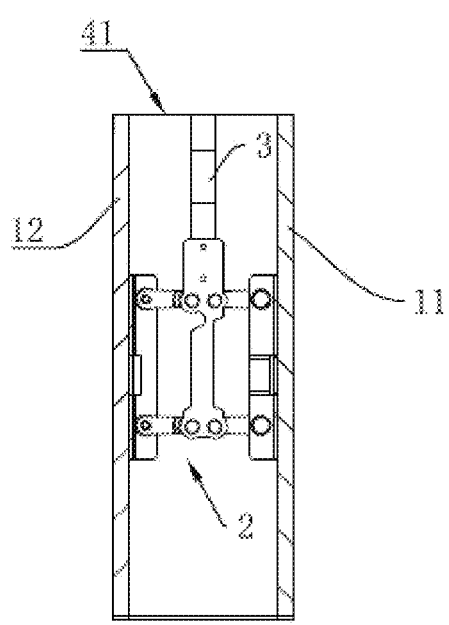
FIG. 6a is a sectional view showing the upper end of a linkage handle rigidly supporting a flexible support surface.
Figure 6B:
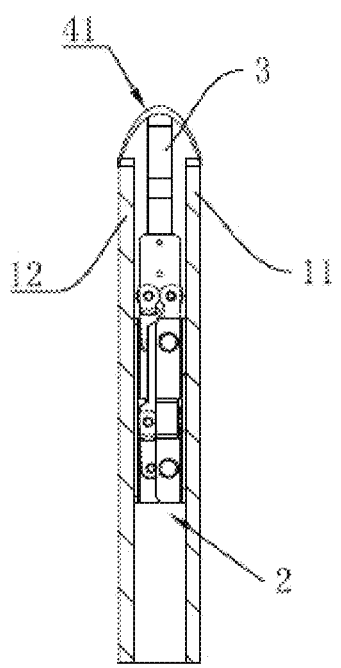
FIG. 6b is a sectional view showing the upper end of a linkage handle upwards tightening a flexible support surface.

Furthermore, as shown in FIG. 6a and FIG. 6b, the armrest further includes an armrest skin cover 4 coated between the movable outer side board and the fixed vertical board 11. When the armrest is in the unfolded state, the armrest skin cover 4 is formed with a flexible support surface 41 in a horizontal tightened state at the upper end of the movable vertical board 12 and the fixed vertical board 11; and the flexible support surface 41 can allow a soft packing support material to be placed on the armrest and flexibly support an arm, improving the comfort of the armrest.

Furthermore, the linkage handle 3 also acts on the flexible support surface 41 of the armrest skin cover 4 when lifting and unfolding or folding the armrest. When the armrest is in the folded state, the linkage handle 3 upwards protrudes out of the movable vertical board 12 and the fixed vertical board 11, and makes the armrest skin cover 4 tightened upwards. When the linkage handle 3 is pressed down to switch the armrest to the unfolded state, the linkage handle 3 is flush with the upper ends of the movable vertical board 12 and the fixed vertical board 11, and rigidly supports the flexible support surface 41 horizontally tightened at the upper end of the armrest. When the armrest is folded, under the action of the linkage handle 3, the outer surface of the tightened armrest skin cover 4 remains flat without wrinkles, ensuring the beauty of the armrest skin cover 4. When the armrest is unfolded, under the supporting of the linkage handle 3, the bearing capability of the flexible support surface 41 is improved, such that when placing a soft packing material, the flexible support surface 41 will not sag inwards due to an insufficient support force.

Figure 10:
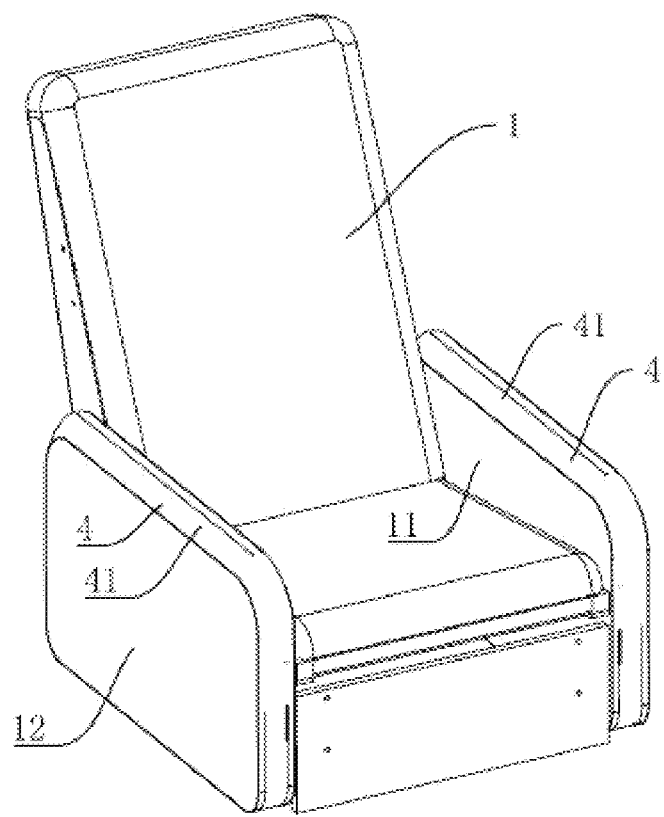
FIG. 10 is a schematic structural diagram showing the upper end of a linkage handle upwards tightening a flexible support surface on an armrest.
Figure 11:
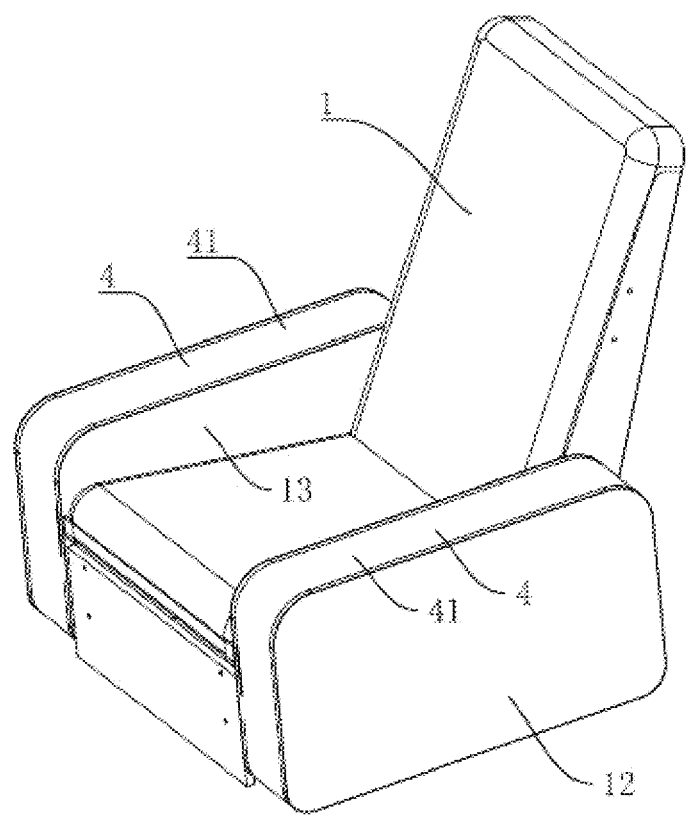
FIG. 11 is a schematic structural diagram showing the upper end of a linkage handle rigidly supporting a flexible support surface on an armrest.

As shown in FIG. 10 and FIG. 11, on the basis of the armrest, a seat is further provided. The seat may be a sofa, including a sofa body 1 and two armrests. The armrests are symmetrically arranged on the left and right sides of the sofa body 1, and fixed vertical boards 11 of the armrests are connected to the sofa body 1. In the sofa, the armrests are arranged as armrest modules 13 on the left and right sides of the sofa body 1, to save a space when the sofa is packed.

Furthermore, most of the armrests mounted on the sofa remain in contact with the ground like the sofa body, but there are also some armrests on the sofa which are not in contact with the ground but remain suspended. When arms or a body apply a downward pressure to the armrests, the movable vertical boards 12 of the armrests may be misaligned with the fixed vertical boards 13. Therefore, the structural advantages of the first tooth portion 221 and the second tooth portion 231 in the adjustment module 2 can be reflected in such a suspended armrest. For example, when the connecting component 21 connected to the first connecting rod 22 is connected to the movable vertical board 12, and the connecting component 21 connected to the second connecting rod 23 is connected to the fixed vertical board 13, when the movable vertical board 12 has a tendency to move downwards, the force is transmitted to the first connecting rod 22, such that the first connecting rod 22 drives the first tooth portion 221 to have a reverse rotation tendency. At this time, relying on the limiting effect of the second tooth portion 231 on the first tooth portion 221, the movable vertical board 12 can maintain a stable supporting state, thereby avoiding a misalignment phenomenon that one side of the armrest is high and the other side is low.

Figure 12:
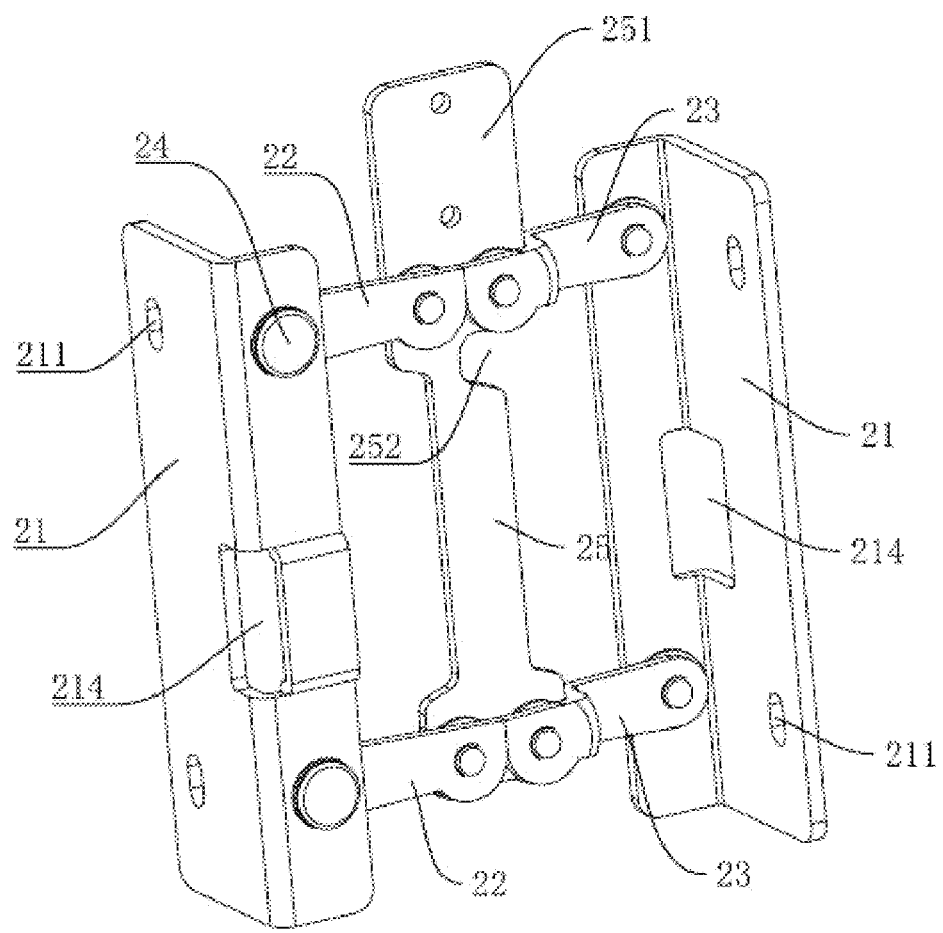
FIG. 12 is a schematic structural diagram showing an adjustment mechanism according to Embodiment 2.
Figure 13:
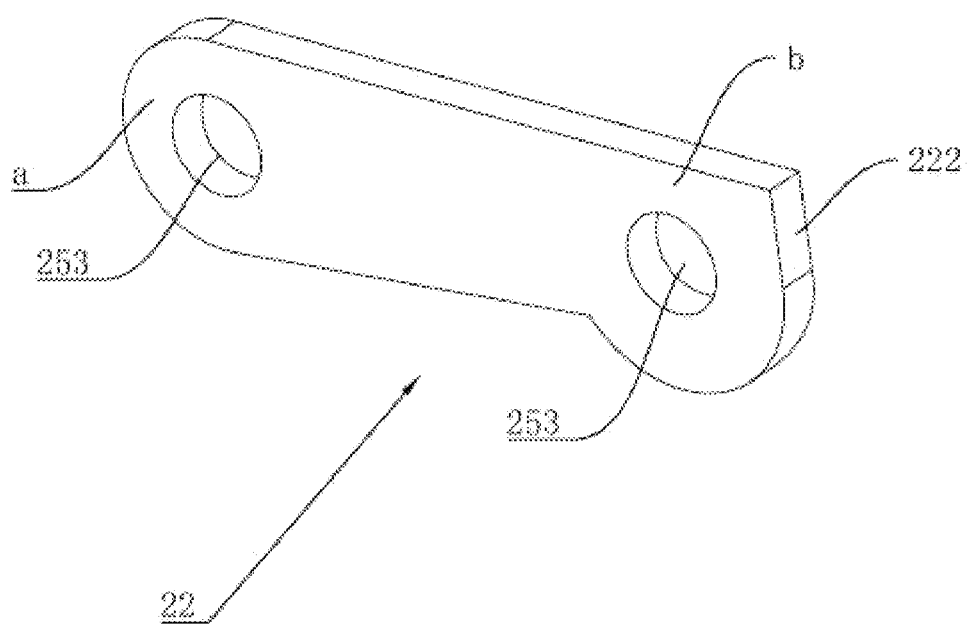
FIG. 13 is a schematic structural diagram showing a first connecting rod according to Embodiment 2.
Figure 14:
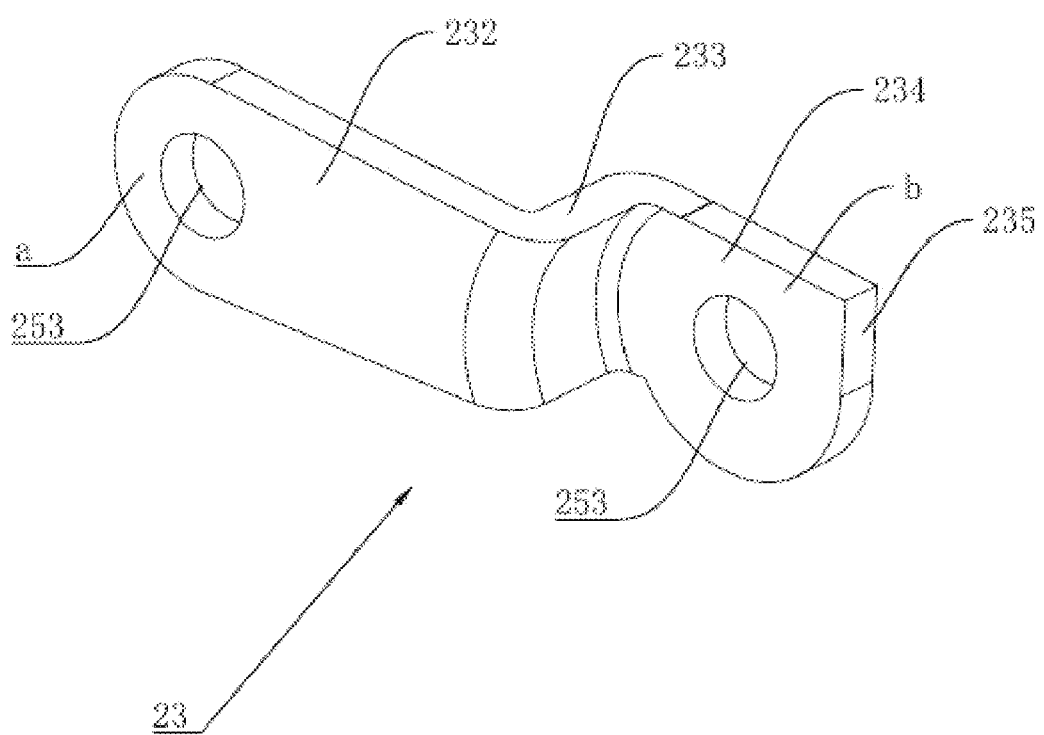
FIG. 14 is a schematic structural diagram showing a second connecting rod according to Embodiment 2.

Embodiment 2: as shown in FIG. 12 to FIG. 14, this embodiment differs from Embodiment 1 in that: in the adjustment mechanism of this embodiment, the first tooth portion 221 and the second tooth portion 235 in the limiting structure are not provided on the linkage ends b of the first connecting rod 22 and the second connecting rod 23. The adjustment mechanism in this embodiment can also realize the unfolding or folding of the connecting assemblies under the driving of the linkage member 25. Without providing the first tooth portion 221 and the second tooth portion 235, the adjustment mechanism in this embodiment is applicable to armrests with smaller volumes and sizes, and the armrests have a short distance, so that the normal unfolding or folding of the arrests is not affected even if the armrests rotate inconsistently.

Figure 15:
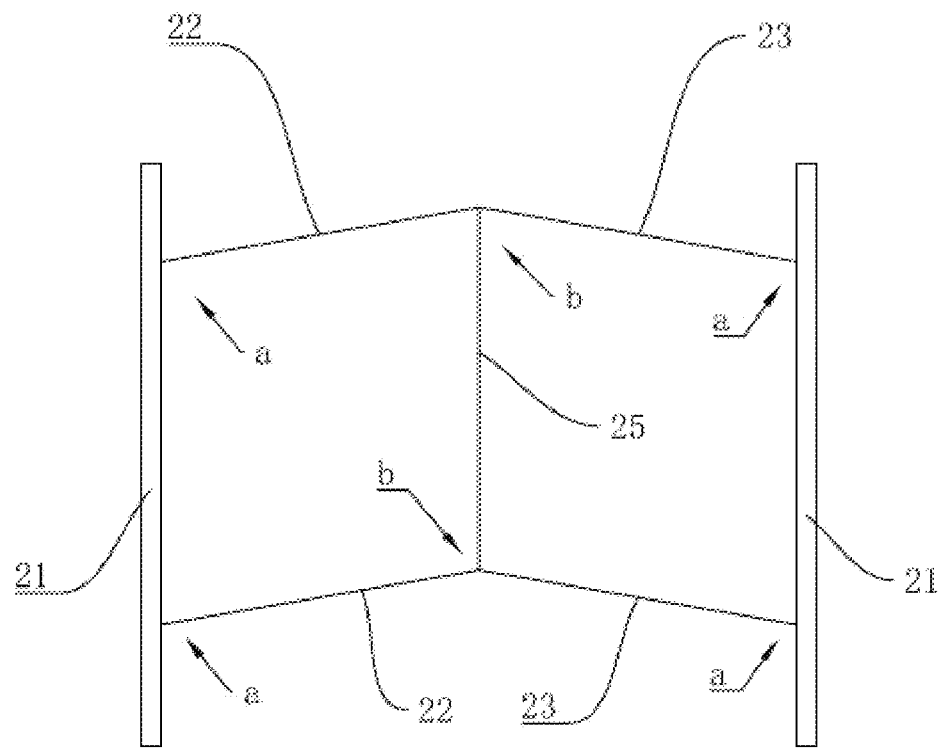
FIG. 15 is a principle diagram showing an adjustment mechanism according to Embodiment 3.

Embodiment 3: as shown in FIG. 15, this embodiment differs from Embodiments 1 and 2 in that: in this embodiment, the linkage end b of the first connecting rod 22 and the linkage end b of the second connecting rod 23 are not hinged at two positions of the linkage rod 25, but are hinged at the same point on the linkage rod 25. When an external force acts on the linkage rod 25 or the connecting components 21, the linkage rod 25 can also drive the first connecting rod 22 and the second connecting rod 23 to realize the unfolding or folding of the connecting assemblies, thereby achieving the same effect as that in the above embodiments.

What is claimed is:

1. An adjustment mechanism, comprising:
a connecting assembly, comprising two connecting components (21) arranged at an interval, wherein the two connecting components (21) have an unfolded state in which the two connecting components are away from each other and a folded state in which the two connecting components are close to each other, and at least two adjustment rod groups arranged side by side are provided between the two connecting components (21);
the at least two adjustment rod groups, each comprising a first connecting rod (22) and a second connecting rod (23) that are respectively hinged to the two connecting components (21), wherein the first connecting rod (22) and the second connecting rod (23) each comprise a connecting end (a) hinged to a corresponding connecting component (21) and a linkage end (b) away from the connecting end (a); and
a linkage rod (25), hinged to the linkage end (b) of the first connecting rod (22) and the linkage end (b) of the second connecting rod (23) in each adjustment rod group, wherein
under an action of an external force on the adjustment mechanism, the linkage rod is enabled to generate a movement tendency and hence drive the first connecting rod (22) and the second connecting rod (23) in each adjustment rod group to rotate, the two connecting components (21) are hence enabled to move away from or close to each other, and the connecting assembly is switched between the unfolded state and the folded state accordingly.

2. The adjustment mechanism according to claim 1, wherein a synchronous structure is provided between the first connecting rod (22) and the second connecting rod (23), and the synchronous structure comprises a first tooth portion (221) provided on the linkage end (b) of the first connecting rod (22) and a second tooth portion (231) provided on the linkage end (b) of the second connecting rod (23); and the first tooth portion (221) and the second tooth portion (231) are engaged with each other to ensure synchronous rotation of the first connecting rod (22) and the second connecting rod (23).

3. The adjustment mechanism according to claim 1, wherein a limiting structure is provided between the first connecting rod (22) and the second connecting rod (23), and the limiting structure comprises a first limiting surface (222) provided at the linkage end (b) of the first connecting rod (22) and a second limiting surface (235) provided at the linkage end (b) of the second connecting rod (23); when the connecting assembly is in the folded state, the first limiting surface (222) is apart from the second limiting surface (235); and when the connecting assembly is switched to the unfolded state, the first limiting surface (222) abuts against the second limiting surface (235).

4. The adjustment mechanism according to claim 1, wherein the first connecting rod (22) and the second connecting rod (23) have a same length.

5. The adjustment mechanism according to claim 1, wherein the two connecting components (21) are both L-shaped boards made of metal, and the two L-shaped boards are arranged in a central symmetry manner; and when the connecting assembly is in the folded state, an accommodating region(s) for accommodating the adjustment rod groups and the linkage rod (25) is formed between the two L-shaped boards.

6. The adjustment mechanism according to claim 5, wherein the two L-shaped boards each comprise a first vertical board (213) and a second vertical board (212) that are perpendicular to each other; the connecting end (a) of the first connecting rod (22) is hinged to the first vertical board (213) of one of the two L-shaped boards, and the connecting end (a) of the second connecting rod (23) is hinged to the first vertical board (213) of the other one of the two L-shaped boards; and the second vertical board (212) extends in a direction perpendicular to the first vertical board (213), such that two extension portions (c) respectively exceeding the accommodating region(s) in opposite directions are formed between the two L-shaped boards.

7. The adjustment mechanism according to claim 6, wherein a through connecting notch (211) is formed in the extension portion (c) of the second vertical board (212).

8. The adjustment mechanism according to claim 1, wherein the first connecting rod (22), the second connecting rod (23), and the linkage rod (25) are all rigid rod members made of metal.

* * * * *